US005455821A

United States Patent [19]
Schaeffer et al.

[11] Patent Number: 5,455,821
[45] Date of Patent: Oct. 3, 1995

[54] COMMUNICATION SYSTEM RESOURCE ALLOCATION METHOD

[75] Inventors: Dennis R. Schaeffer, Buffalo Grove; Mark T. Ahlenius, Lombard, both of Ill.

[73] Assignee: Motorola, Inc., Schaumburg, Ill.

[21] Appl. No.: 337,345

[22] Filed: Nov. 10, 1994

[51] Int. Cl.$^6$ .............................. H04J 4/00; H04Q 7/36
[52] U.S. Cl. ........................ 370/17; 370/50; 370/69.1; 370/95.3
[58] Field of Search ............................ 370/13, 17, 50, 370/69.1, 75, 76, 95.1, 95.3, 110.1; 379/59, 63; 455/33.1

OTHER PUBLICATIONS

Anton, Manuel Duque, Kunz, Dietmar and Ruber, Berhard, "Channel Assignment Using Simulated Annealing", pp. 121–128.

*Primary Examiner*—Melvin Marcelo
*Attorney, Agent, or Firm*—Anthony G. Sitko

[57] ABSTRACT

A method of allocating communication resources in a communication system includes retrieving (404) from the communication system a communication system resource allocation. An allocation parameter is set to an initial value (406) and communication resources are randomly selected from cells (414). A candidate communication resource is either swapped or mutated for the selected communication resource (416) and the system performance is evaluated with the candidate communication resource (422). If system performance is improved the candidate resource is retained as part of the allocation (426, 432), or if system performance is degraded, the candidate resource is retained with a probability (428, 432). The steps repeat while the allocation parameter is valid (408), and upon completion a new communication resource allocation is downloaded to the communication system (410).

28 Claims, 7 Drawing Sheets

COMMUNICATION SYSTEM RESOURCE ALLOCATION METHOD

FIELD OF THE INVENTION

The present invention relates generally to communication systems, and more particularly, to a method of allocating communication resources in a communication system.

BACKGROUND OF THE INVENTION

Communication systems, and particularly cellular communication systems, are well known. Cellular communication systems, as is known, consist of individual cell sites, each equipped to communicate with mobile communication units located within the cell site. Communication in a cell site is conducted over a communication resource, often referred to as a communication channel, which may consist of a pair of radio frequencies which are used by the mobile communication unit to transmit and receive information with the cell site transceiver. Several of the communication resources may be dedicated to particular functions such as two-way transmission of control information. The total number of communication resources, however, is limited.

In planning cellular radiotelephone systems there is a never ending tension among maximizing system capacity, providing Carrier-to-Interferer (C/I) immunity, meeting cell-to-cell hand-off topography, and etc. This is due primarily to the scarce radio spectrum available, i.e., the scarce number of communication channels. To increase capacity, the limited number of communication resources are repeatedly reused at different cell sites throughout the cellular communication system. However, higher resource reuse adversely affects C/I and may not be possible because of hand-off criteria. Thus the system operator is left with the very difficult task of allocating resources to the cells in the most efficient way possible. This task, however, is very labor intensive. Once resources are allocated within a system, tuning of the system to reduce the effects of interfering resources or adding/removing resources from cells to balance capacity is often not performed even though system performance suggests that it should be.

The present methods of assigning frequencies (channels) to the cell sites of a cellular system are generally manual. Prearranged groups of frequencies are typically assigned to cells which are laid out in a specific reuse pattern (typically a grid of evenly packed hex cell sites). This method assumes that the cell sites will be installed "on grid" from the planning process. Unfortunately, many constraints such as expensive real estate, infeasible antenna locations, zoning ordinances, etc. prevent the cellular operator from obtaining rights to install the cell sites at these "on-grid" locations. Not having cell sites installed on the grid causes many interference problems when attempting to use normal frequency reuse patterns. This is due to the fact that many reused and adjacent channels are installed at cell sites which are no longer "on grid" with one another (e.g. too close) and thus interfere with one another. Propagation tools are used to examine specific areas of the system to determine if there will be any potential problems with channel reuse or adjacent channel usage between pairs of cells. For difficult terrain areas (mountains, water, heavy building density), grid-based frequency planning is difficult due to radio frequency (RF) propagation problems.

The reuse frequency planning method uses sets of predefined groups of frequencies for each reusing sector or cell site in the reuse pattern. There are different frequency groups for each type of reuse pattern. For example, there are typically 14 voice channels in each of 24 subgroups for the Advanced Mobile Phone Service (AMPS) 4—sector reuse pattern. An entire subgroup of voice channels is typically allotted (reserved) for each sector or cell site. If only 8 channels are required in a specific site, then the extra channels are either reserved (wasting the resource), or the subgroup is splintered into fractional groups and is reused elsewhere.

The frequency planning process is a very time consuming process. Typically a set of assignments are made on paper, and then RF propagation estimates are made to determine if there will be any problems between reusing/adjacent channels. If problems are detected, then the human planner backtracks undoing some of the channel assignments, and redoing them with new channel assignments. This iterative process continues until an acceptable plan is achieved. For a typical system such as Las Vegas, this process may take 3–4 weeks from scratch.

It has been proposed to utilize automated methods to provide for communication resource allocation. For example, in the commonly assigned U.S. patent application Ser. No. 08/322,046 filed Oct. 12, 1994 entitled "Method of Allocating Communication Resources in a Communication System" by Allan Shedlo, a method providing for channel tuning in a cellular system allocated channels is taught. The method utilizes reiterative techniques for altering the channel allocation of a cellular system based upon a predefined set of allocation criteria.

There has also been suggested by Anton, Kunz and Ruber in their paper "CHANNEL ASSIGNMENT USING SIMULATED ANNEALING", a method of channel allocation utilizing the technique known as simulated annealing. Simulated annealing is, as it is titled, characterized as a simulation of the annealing process which occurs in nature to achieve a system minimum. Several draw backs of applying these simulated annealing techniques to channel assignment include unacceptable convergence times and lack of 100 percent channel assignment.

Therefore, a need exists for a method of allocating and reallocating communication resources to cells of a communication system which accounts for the various criteria which must be satisfied within the system without consuming an inordinate amount of time and resources. Such a method must further permit 100 percent channel assignment while concomitantly reducing channel interference and co-channel and adjacent channel reuse at hand-off candidate cells.

BRIEF DESCRIPTION OF THE DRAWINGS

FIGS. 4-A and 4-B illustrate in flow chart form a method of allocating resources within a communication system in accordance with a preferred embodiment of the present invention;

FIGS. 6-A, 6-B and 6-C are flow charts further illustrating the method of determining the system performance level in accordance with a preferred embodiment of the present invention.

DETAILED DESCRIPTION OF THE PREFERRED EMBODIMENTS

The present invention is directed to a method of allocating resources within a cellular communication system. The method of the present invention is equally applicable to performing an initial resource allocation of the cellular communication system as to "tuning" or reallocating communication resources within an existing system.

Figures 1, 3:
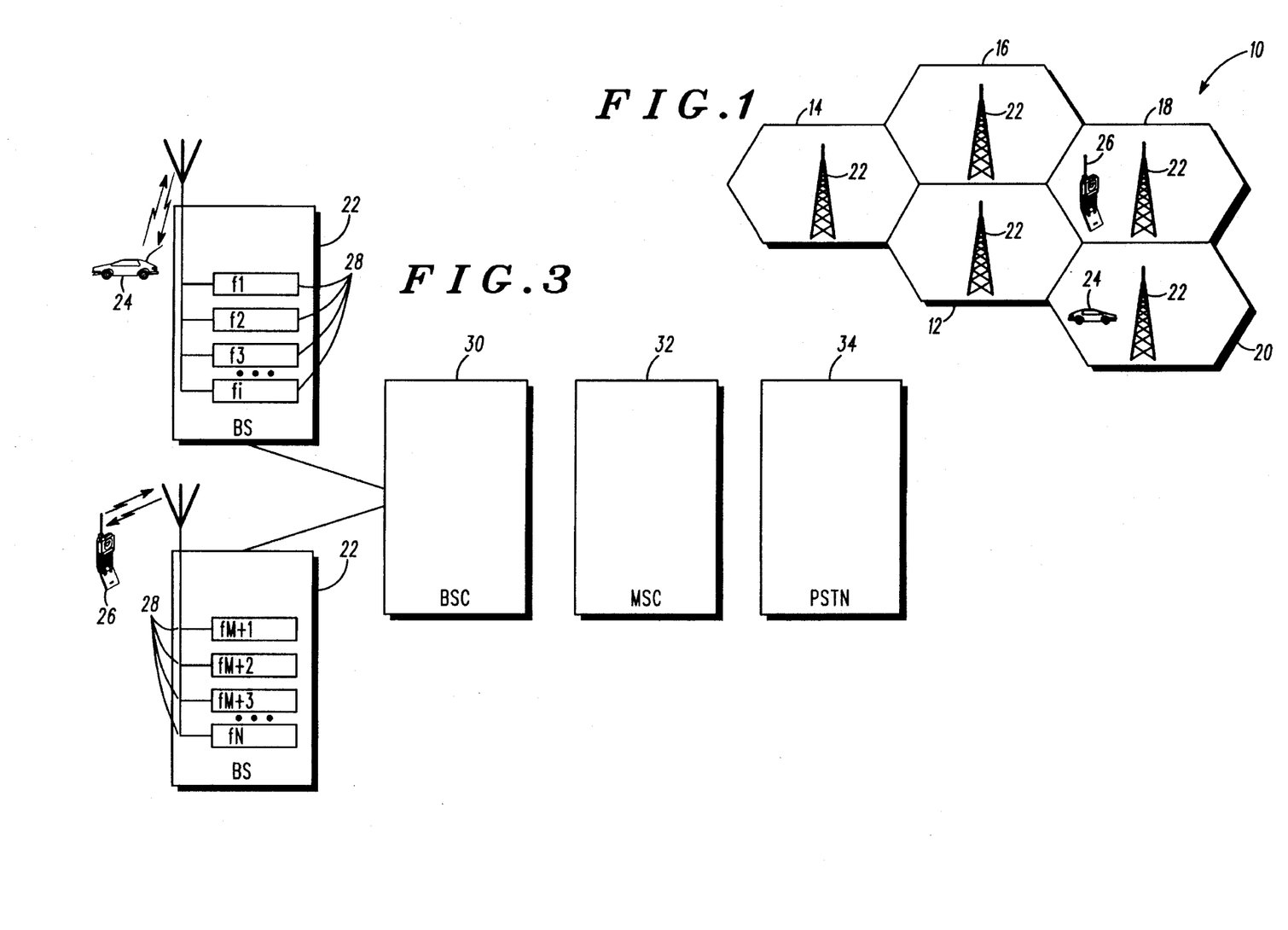
FIG. 1 is a diagram illustrating a typical cellular communication system.
FIG. 3 is a block diagram illustrating a typical communication system.

With reference to FIG. 1, a typical cellular communication system 10 is shown to include a plurality of cells 12–20 each cell being serviced by a base station 22, for providing communication services to mobile communication units 24, 26 operating within a cell. The communication services between the base station and the mobile communication unit are provided over a communication resource of a plurality of communication resources allocated to the cell. Communication between the mobile communication units 24, 26 and the base stations 22 can occur in any number of formats such as, for example, frequency division multiple access (FDMA) or time division multiple access (TDMA), as is known. Hence, it should be understood that the communication resource may consist of a communication channel having either a single radio frequency or a pair of radio frequencies as is required for providing duplex communication between the mobile communication units and the base stations.

Figure 2:
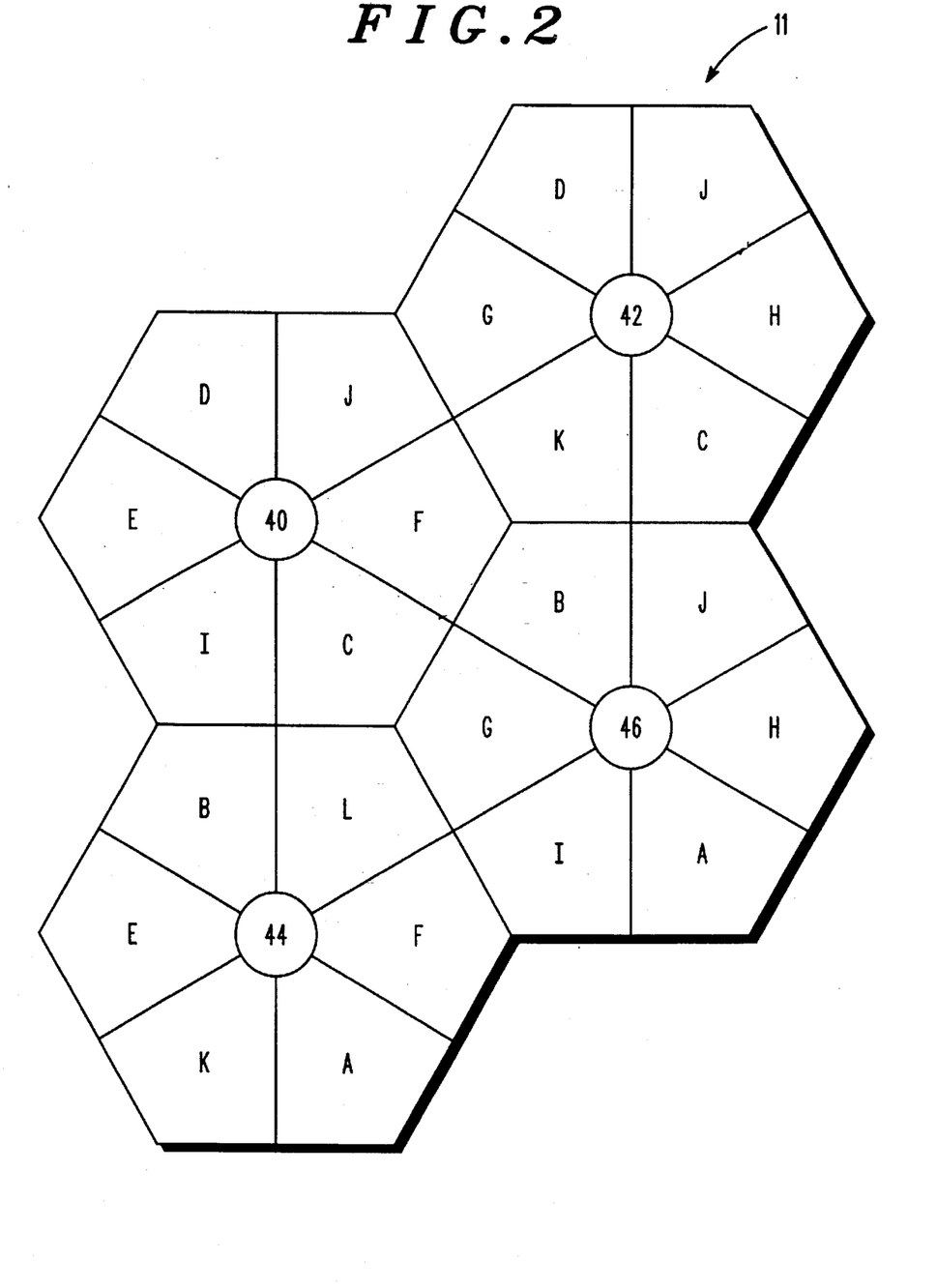
FIG. 2 is a diagram illustrating a sectored cellular communication system with resource assignments.

FIG. 2 illustrates a sectored cell communication system 11. In FIG. 2, cell sites 40, 42, 44, and 46 each are divided into sectors. Each of the sectors are then allocated communication resources (A–L) for servicing mobile communication units operating within the sector. The communication resources (A–L) may consist of groups of communication channels, but may also be individual communication channels. Throughout this specification the term cell is used to refer to a cell, sector, coverage area, or the like indicating a region in which cellular communication services are provided. The operator, in making the resource allocation, must consider, for example: Carrier-to-Interferer (C/I) ratios between all cells, the number of required resources for each cell, the number of channel groups (where the communication resources are allocated as groups of communication channels to a cell), minimum channel spacing and hand-off topology.

FIG. 3 further illustrates elements of the communication system 10. As can be seen, each base station 22 includes a plurality of transceivers 28 which operate to communicate on an allocated communication resource with a mobile communication unit 24 or 26. Base stations 22 may also include dedicated transceivers for providing, for example, control and signaling information over dedicated resources to mobile communication units operating within the cell. Each of the base stations are linked to a base station controller 30. When a mobile communication unit requests service, i.e., initiates a call or is paged to receive a call within a cell, the base station controller 30 directs the appropriate base station to assign a communication resource from a plurality of communication resources allocated to the base station for establishing communications with the mobile communication unit.

The base station controller 30 also directs hand-off of a mobile communication unit from a first cell to a hand-off target cell when appropriate. In such a case, when hand-off is necessary, the base station controller will direct the hand-off target cell base station to assign a communication resource and further directs the first base station to instruct the mobile to tune from the communication resource assigned by the first base station to the communication resource assigned by the target hand-off cell base station. As will be appreciated from the foregoing, in establishing the communication resource allocation, interfering communication resources should not be assigned to cells between which mobile communication units are likely to be handed off. This prevents assignment of an interfering resource by the hand-off target cell base station and the potential loss of the call due to interference.

The base station controller 30 is also in communication with a mobile switching center 32. The mobile switching center acts to receive messages from the base station controller and directs these messages to either the public switch telephone network (PSTN) 34 or to other elements of the communication system such that communication may be established between the mobile communication unit and a land line telephone customer or another mobile communication unit, respectively.

Figure 4A:
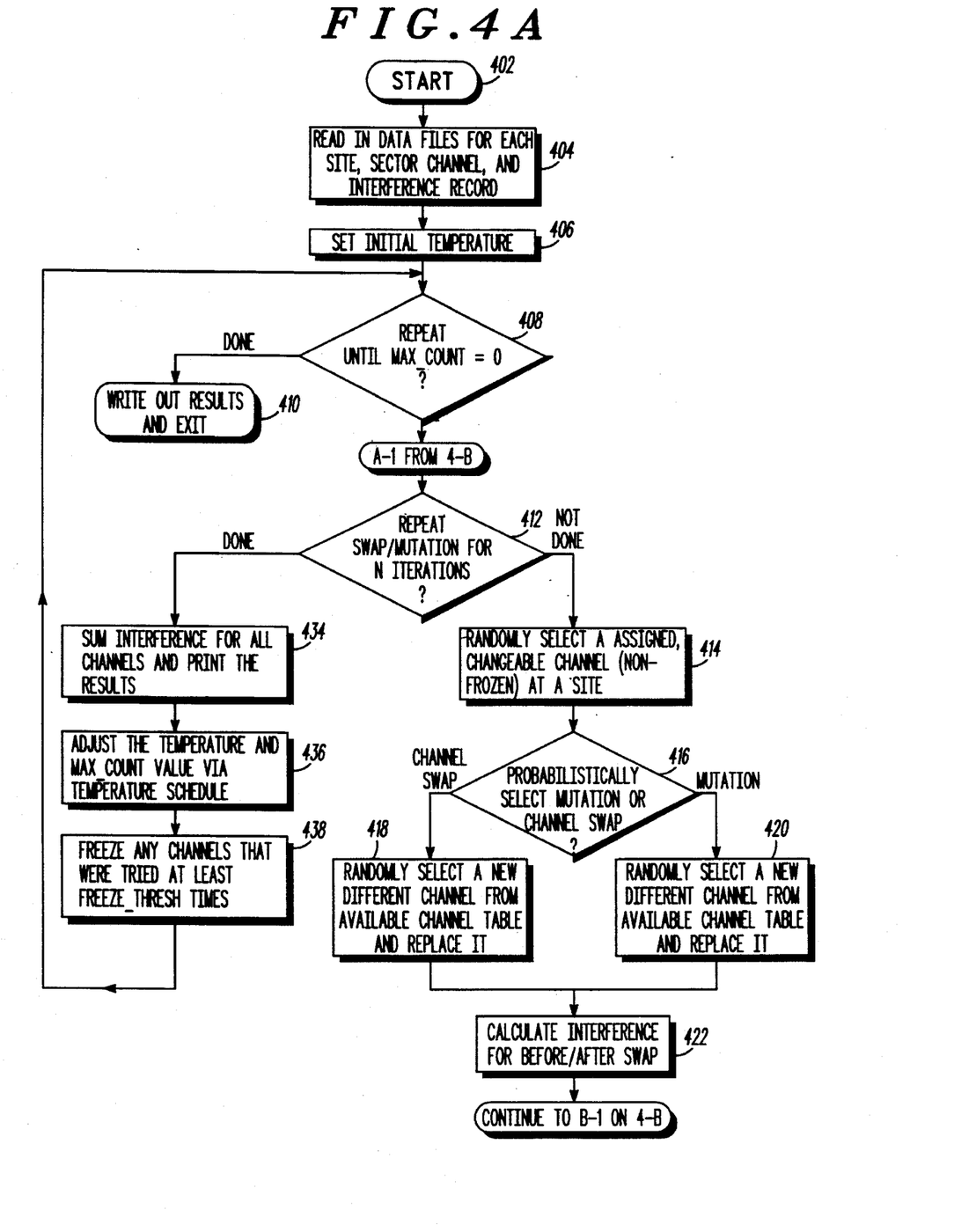
Figure 4B:
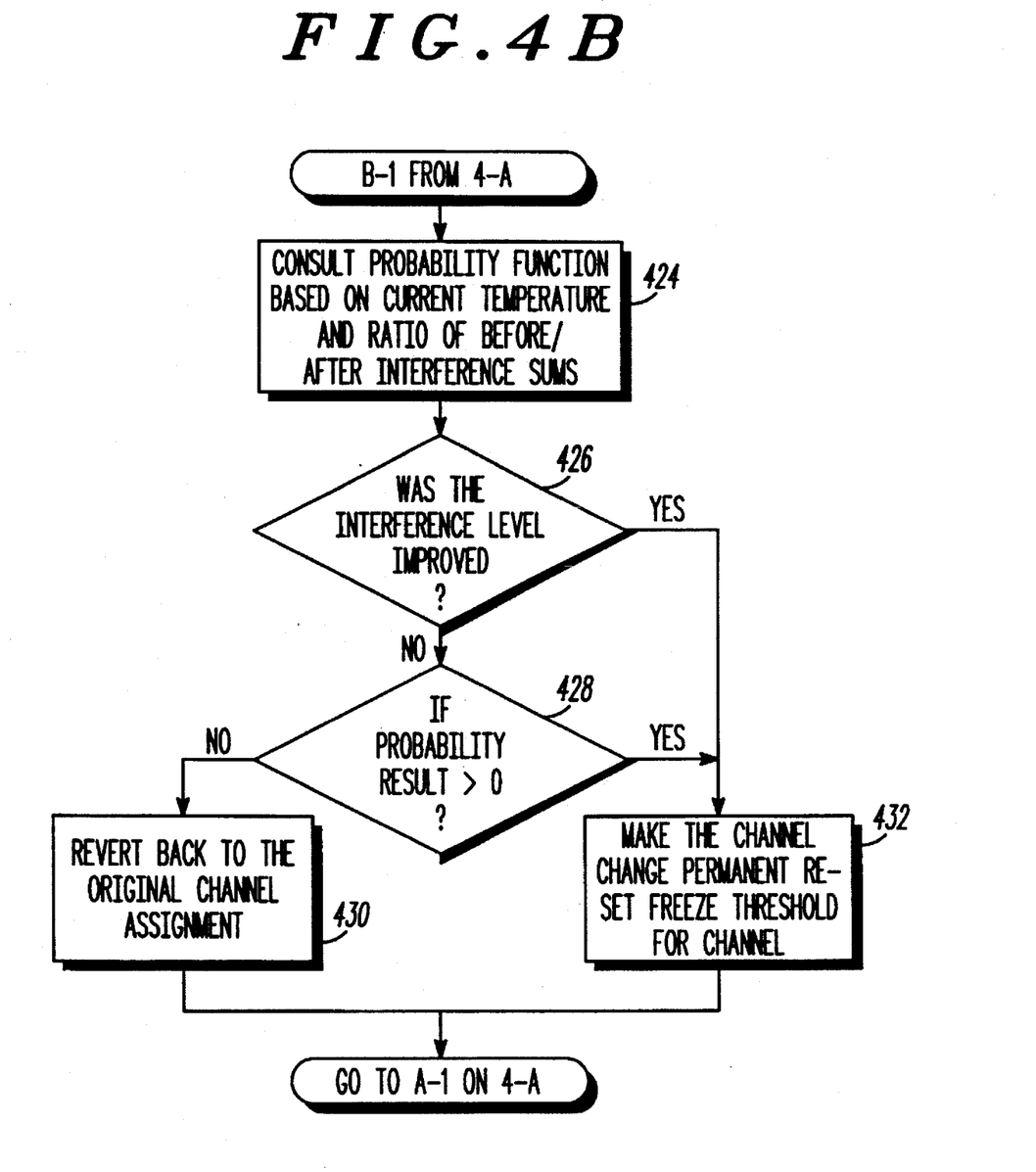

With reference to FIGS. 4-A and 4-B, a communication system resource allocation method in accordance with the present invention is described. The method enters at bubble 402 and proceeds to block 404 where an existing communication system resource allocation is retrieved from a communication system database (not shown). In a typical cellular system the communication resource allocation may be maintained at the MSC, the BSC or at the BTS. The method then proceeds to block 406 where an allocation parameter is set to an initial value.

The method continues to diamond 408. In a preferred embodiment of the present invention, and as will be described in more detail, the method iterates based upon a pair of counters, max_count and N, at various allocation parameter values. Once these iterations of the channel allocation method are completed, the new channel allocation is downloaded to the communication system database at bubble 410.

If max_count has not been reached, the method proceeds to diamond 412. At diamond 412, the second of the aforementioned iteration parameters, N, is checked. The parameter N provides for completing a number of swap/mutations of the system allocation at a given allocation parameter. This is accomplished by first randomly selecting from a cell of the communication system a changeable communication resource, 414. A changeable communication resource is a resource which is assigned to a given coverage area and which is not frozen, as will be described. Next, with a probability, 416, the method identifies a candidate communication resource within the communication system by either randomly selecting the candidate communication resource from another cell of the communication system (i.e., swapping communication resources) 418, or randomly selecting the candidate communication resource from a plurality of available communication resources (i.e., mutating communication resources) 420. This probability may be arbitrarily assigned, and in the preferred embodiment is 0.5. The candidate communication resource is then switched for the changeable communication resource, and the system performance is evaluated with the candidate communication resource, 422.

With the communication resource allocation now including the candidate communication resource and the system performance evaluated, a third probability is determined which is related to the inverse of the allocation parameter, 424. This probability will be used in determining if the candidate communication resource will be made a part of the resource allocation or if the selected changeable communication resource will be retained in the allocation.

At diamond 426, the candidate communication resource is accepted, i.e., retained as part of the communication resource allocation, 432, if the system performance is improved. If the system performance is not improved, the candidate communication resource is rejected. However, based upon the third probability, diamond 428, the candidate communication resource is accepted even if the system performance is degraded. This is to provide for drawing the system out of local minima in search of a lower, global minima and overall improved resource allocation and interference reduction. If the candidate communication resource is rejected, then it is replaced with the changeable communication resource 430.

As previously mentioned, the foregoing is repeated until "N" iterations are completed. After "N" iterations have been completed, 412, the method proceeds to block 434. The interference for each channel is summed and the results are recorded or printed for review by the system planner. Then, at block 436, the allocation parameter, also referred to herein as the temperature, and max_count parameters are adjusted.

The temperature is adjusted from the initial value by multiplying the current temperature by a temperature ratio; in the preferred embodiment the temperature is initially 4.0 and the temperature ratio is 0.5. Thus, in the normal course, the temperature declines from an initial value to a final value, exponentially. As mentioned above, the probability, i.e., the third probability, of retaining a candidate communication resource is related to the current temperature. As the temperature declines, this probability declines. In the preferred embodiment, the third probability is set to one (1) if there is an improvement. If not, a parameter is established related to the logarithm of the ratio of the new system performance metric, to the old system performance metric. The probability will also be set to one (1) if the exponential of the above parameter, divided by the current temperature is greater than a psuedo random number. Otherwise, the probability is zero (0). Hence, as the temperature declines the number of changes in the resource allocation not resulting in improved system performance per iteration is reduced.

During each iteration, the number of channels changed, i.e., the number of times a candidate channel is substituted for a changeable channel in the resource allocation is measured. If, in the initial iteration, the number of changed channels is below a value, the temperature is adjusted upwards. In the preferred embodiment, the current temperature is divided by the temperature ratio. Also, the temperature ratio is changed such that the temperature declines more slowly. In the preferred embodiment the adjusted ratio is 0.9. This provides better "mixing", i.e., swapping and mutating of channels, within the resource allocation and improves the overall result of the resource allocation.

If, after the initial iteration, the number of channels changed is below a value, the temperature ratio is adjusted to cause the temperature to decline more rapidly, in the preferred embodiment, 0.1. This quickens the freezing process and decreases the time to achieve a near optimal resource allocation.

After each temperature adjustment, channels which have been tried consecutively, but not changed, a threshold number of times are frozen, 438. That is, the method maintains statistics on channels relating to the number of consecutive unsuccessful attempts to replace the changeable channel by a candidate channel, i.e., the channel is "tried". If a channel is tried more than a Freeze_thresh number of times without being changed, it is frozen. That is, a statistic is set which indicates that the channel is frozen and is no longer changeable. This reduces the number of changeable channels to those for which a reasonable number of changes are still being made, while freezing relatively "good" channels, those which are not being changed indicating low interference. This measure also acts to decrease the time it takes to arrive at a near optimal channel allocation.

The max_count parameter is also adjusted with reference to the number of channels changed during a given iteration. If any channels are changed at a given temperature and a significant improvement in the system performance is observed, max_count is set to the initial value such that the method will continue to search for a near optimal solution. If, however, no channels are changed at the temperature, max_count is decremented. As previously mentioned, when max_count is zero (0), the channel allocation is completed, 408, and the results are written to the communication system, 410. Hence, the channel allocation will continue until no channels are changed at a temperature for max_count iterations.

Figure 5:
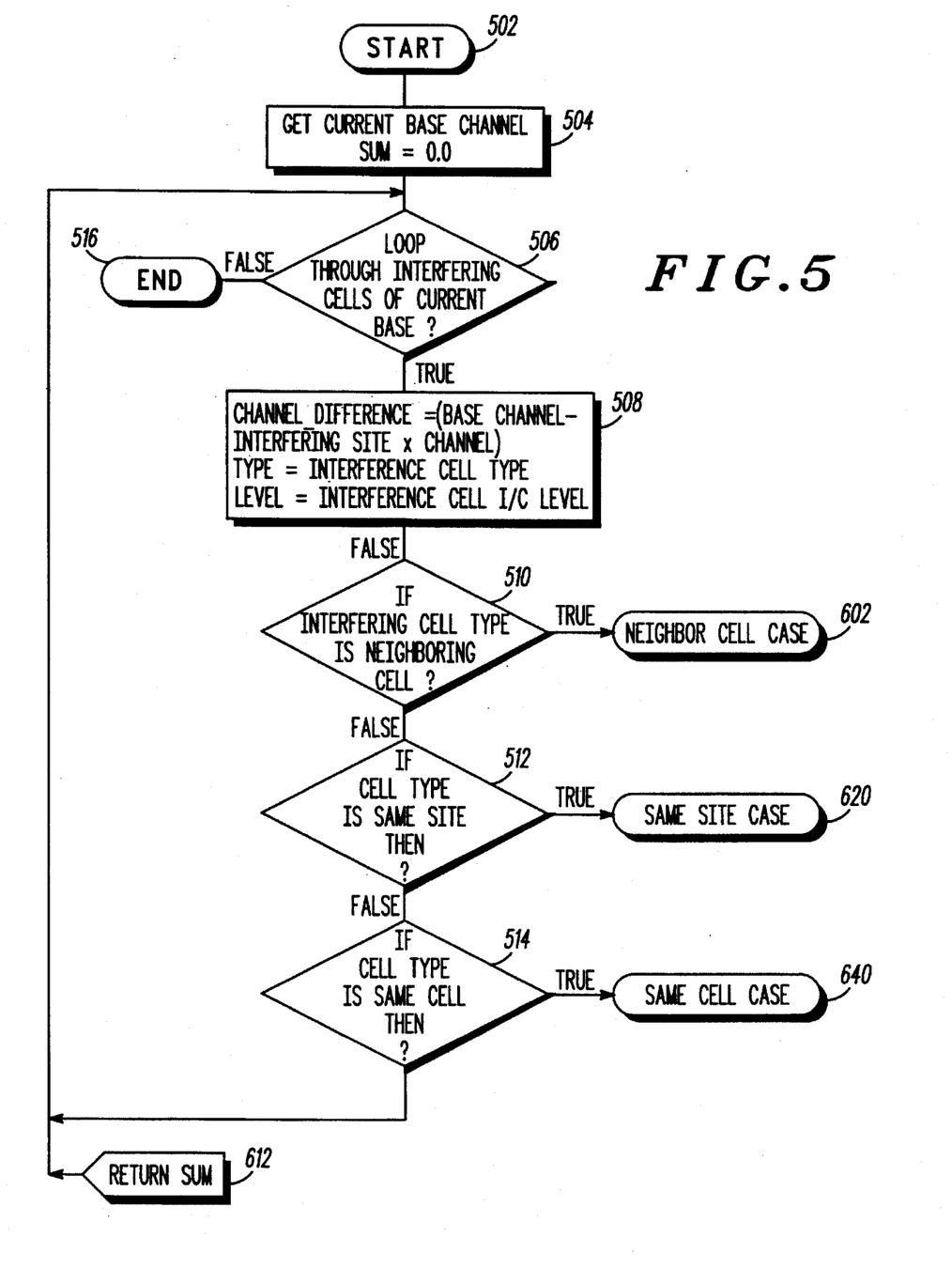
FIG. 5 is a flow chart illustrating a method of determining the system performance level in accordance with a preferred embodiment of the present invention.
Figure 6A:
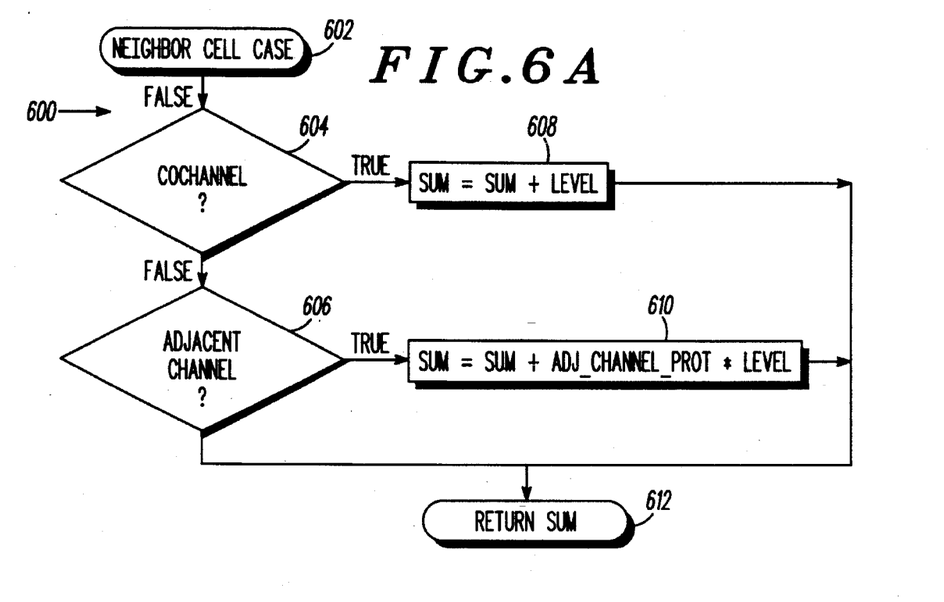
Figure 6B:
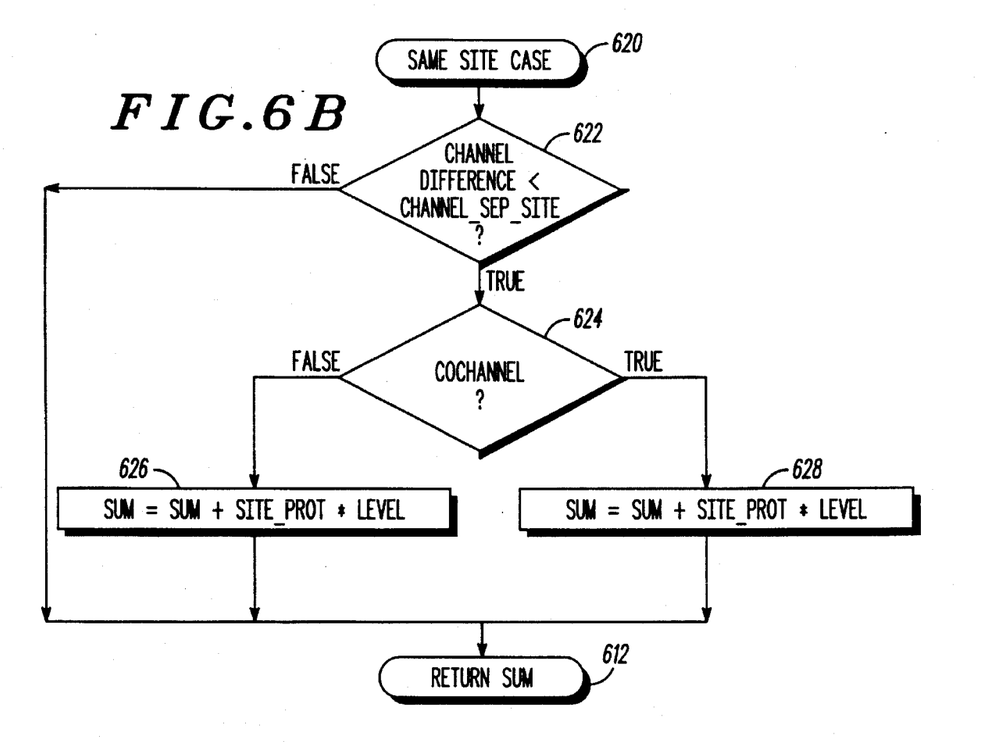
Figure 6C:
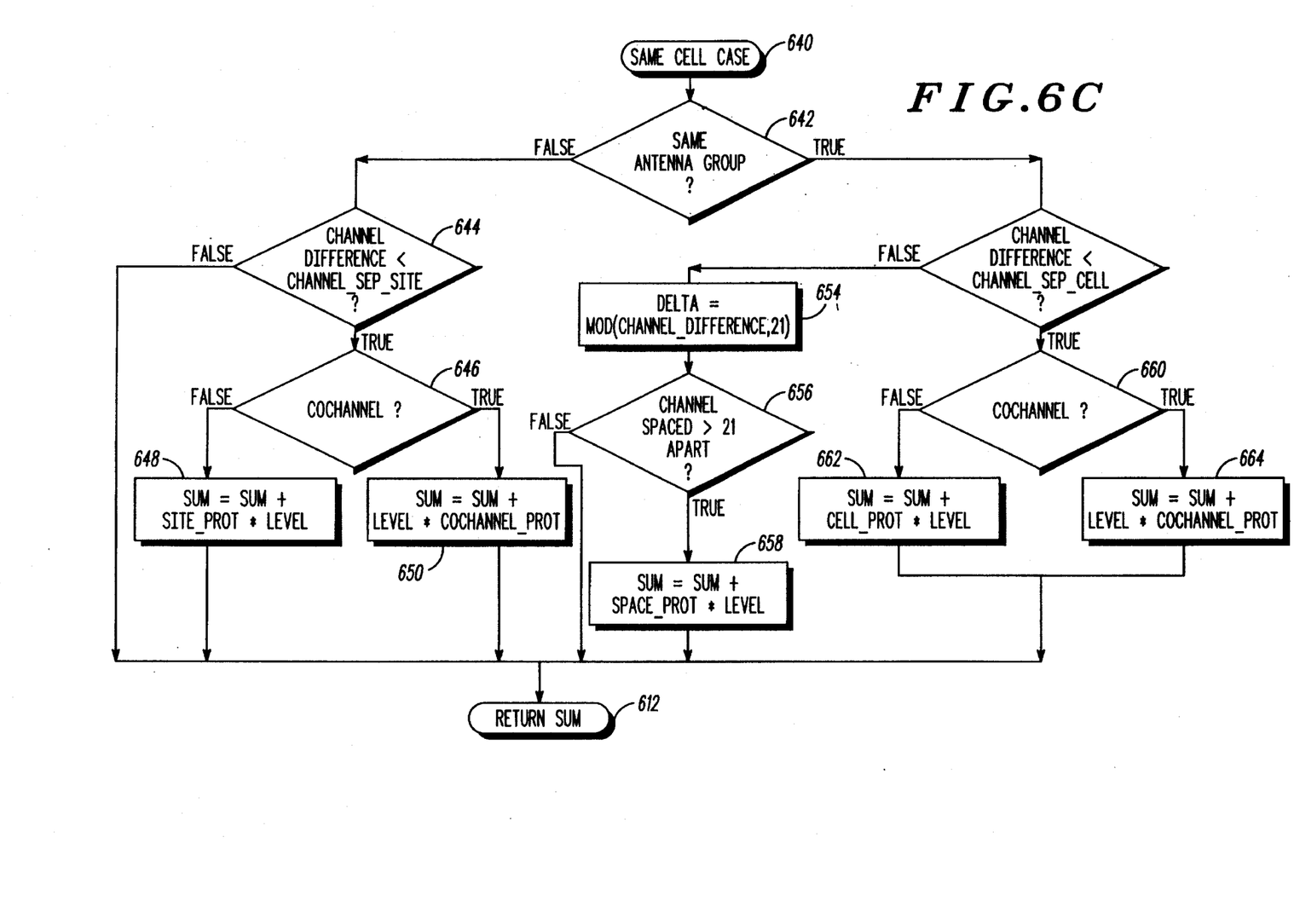

With reference now to FIGS. 5, 6-A, 6-B and 6-C, the method of evaluating system performance in accordance with a preferred embodiment of the present invention will be discussed. The system performance metric for a given channel allocation is based upon interference between channels in the system. In the preferred embodiment, this requires accounting for channel difference, co-channel and adjacent channel interference and cell type.

System performance evaluation begins at bubble 502 and proceeds to block 504 where the current base channel, i.e., the channel being evaluated, is identified and a summing parameter, sum, is set to zero (0). As will be explained, the summing parameter accumulates as an indicator of the system interference. As will also be explained this system interference value includes a weight of individual channel interference values based upon channel type and location or cell type. It provides a means for evaluating system performance through comparison of sums for various channels.

At diamond 506, the method loops through each of the interfering cells for the base channel. For each channel in the interfering cell, a channel difference is calculated, 508. The channel difference is the numerical difference between the channel number of the base channel and the channel number of the interfering channel. Next, the sum for the base channel is accumulated based upon the channel difference, the relationship to other channels, i.e., co-channel or adjacent channel, and a cell type factor.

With reference to FIGS. 5 and 6-A, at diamond 510 if the interfering channel is a "neighboring cell" channel, the method proceeds to bubble 602. A neighboring cell is identified by the site number of the interfering channel. If the site number is different than the site number of the base channel, the cell is a neighboring cell. In the neighboring cell, if the interfering channel is a co-channel, 604, sum is increased by adding the interference level, 608. If the interfering channel is an adjacent channel 606, sum is increased by adding to it the product of the interference level and an adjacent channel protection factor Adj_Chan_Prot, 610. In the preferred embodiment, the Adj_Chan_Prot factor is 21.0 dB. If the interfering channel is neither a co-channel nor an adjacent channel, no value is added to sum. The sum value is returned at bubble 612.

With reference to FIGS. 5 and 6-B, at diamond 512 if the interfering channel is a "same site" channel, the method proceeds to bubble 620. An interfering channel is a same site channel if it is located at the same base station, i.e., has the same site number, as the base channel, but is not within the same sector. If the channel difference is less than a threshold, Chan_Sep_Site, 622, then the interfering channel is checked as a co-channel 624. If the interfering channel is a co-channel, then sum is increased by the product of the interference level and a co-channel protection factor, CoChan_Prot, 628. In the preferred embodiment, the co-channel protection factor is 19.0 dB. If the interfering channel is not a co-channel, there is still a penalty since the channels are located at the same site. Sum is increased by the product of the interference level and a site protection factor, Site_Prot, 626. In the preferred embodiment, the site protection factor is 20.0 dB. Sum is returned at bubble 612.

With reference to FIGS. 5 and 6-C, at diamond 514, if the interfering channel is a "same cell" channel, the method proceeds to bubble 640. An interfering channel is a same cell channel if it has the same site number and cell number as the base cell. From bubble 640, the method proceeds to diamond 642 to determine if the channels are assigned to the same antenna group. If they are, the method proceeds to diamond 652 to determine if the channels have sufficient separation, i.e., if the channel difference is greater than a channel separation parameter, Chan_Sep_Cell. In the preferred embodiment, the channel separation parameter is 17. If the interfering channel and base channel are not sufficiently separated, then the interfering channel is checked as a co-channel, 660. If it is a co-channel, sum is increased by the product of the interference level and the co-channel protection parameter, CoChan_Prot, 664. If the interfering channel is not a co-channel, then sum is increased by the product of the interference level and a cell protection parameter, Cell_Prot, 662. In the preferred embodiment, the cell protection parameter is 1.5.

If, at diamond 652, the channel separation is greater than the channel separation parameter, then the difference, delta, between the channel difference and 21 is determined, 654. If the channels are spaced less than 21 channels apart 656, then no action is taken. This means that the channels are sufficiently spaced without undue spreading of channels at a cell. If the channels are spaced more than 21 apart, the channel difference is increased by the product of the spacing protection factor, Space_Prot, and the interference level, 658. This encourages close packing of channels within a cell.

If, at diamond 642, the channels are not on the same antenna group, the method proceeds to diamond 644 to again determine the channel separation, 644. Similar to the above, if the channel separation is less than a site channel separation parameter, Chan_Sep_Site, 644, the method proceeds to determine if the interfering channel and the base channels are co-channels, 646. If they are co-channels, channels, sum is increased by the product of the interference level and a co-channel protection factor, CoChan_Prot, 650. Otherwise, sum is increased by the product of the interference level and the site protection factor, Site_Prot, 648. Sum is returned at bubble 612.

The interference level between the interfering channel and the base channel is related to the inverse of the carrier to interferer, inverse C/I, ratio on both the forward and reverse channels. In the preferred embodiment, the interference level is the sum of the inverse C/I on the forward and reverse channels expressed as a power ratio.

From the foregoing it will be readily appreciated that communication system resource allocation is greatly enhanced. The channel allocations achieved not only have reduced channel interference, but also provide efficiently spaced, densely packed communication channels. Each of the foregoing advantages being achieved with greatly reduced processing times. Moreover, the method provides for initial resource allocation as well as system retuning for enhanced system operation and efficiency. It will be readily appreciated by one of ordinary skill in the art, however, that its teachings have application beyond the preferred embodiments described herein.

We claim:

1. A method of allocating communication resources in a communication system comprising the steps of:

a) retrieving from the communication system a communication system resource allocation;

b) setting an allocation parameter to an initial value;

c) randomly selecting from a cell of the communication system an allocated communication resource;

d) identifying a candidate communication resource within the communication system by either randomly selecting the candidate communication resource from another cell of the communication system with a first probability or randomly selecting the candidate communication resource from a plurality of available communication resources with a second probability;

e) switching the candidate communication resource for the allocated communication resource;

f) evaluating a system performance metric;

g) accepting the candidate communication resource if the system performance metric is improved;

h) accepting with a third probability the candidate communication resource if the system performance metric is degraded;

i) rejecting the candidate communication resource if it is not accepted in either the step (g) or the step (h) and replacing the candidate communication resource with the allocated communication resource;

j) adjusting the allocation parameter according to a defined schedule;

k) repeating the steps (c) through (i) while the allocation parameter exceeds a threshold value; and l) downloading the communication system resource allocation to the communication system database.

2. The method of claim 1 wherein the third probability is a function of the allocation parameter.

3. The method of claim 1 further comprising prior to the step (j), the step of repeating the steps (c) through (i) a first number of times.

4. The method of claim 1 wherein the step (j) further comprises, measuring an acceptance rate of candidate communication resources and adjusting the allocation parameter if the acceptance rate is less an acceptance threshold.

5. The method of claim 4 further comprising after the step (j) freezing communication resources allocated to the cell if failed consecutive attempts to substitute candidiate communication resources therefore goes above a freeze threshold.

6. The method of claim 5 wherein the step (c) further comprises randomly selecting a non-frozen allocated communication resource.

7. The method of claim 1 wherein the step (f) comprises determining a system interference value.

8. The method of claim 7 wherein the step of determining a system interference value comprises determining an interference level between the candidate communication resource and an interfering communication resource as the inverse of the carrier-to-interferer ratio expressed as a power ratio.

9. The method of claim 8 wherein the step of calculating a system interference value further comprises:
   ii) identifying a type of the interfering communication resource; and
   iii) modifying the system interference value in response to the type.

10. The method of claim 9 wherein the step of calculating a system interference value further comprises:
   vi) repeating the steps (i) through (iii) for a plurality of interfering communication resources; and
   v) summing the system interference value for each of the plurality of interfering communication resources.

11. The method of claim 1 wherein the communication system comprises a time division multiple access (TDMA) communication system.

12. The method of claim 1 wherein the allocated communication channel comprises a pair of radio frequencies in a frequency division multiple access (FDMA) communication system.

13. A communication system resource allocation method comprising the steps of:
   a) retrieving from a communication system database a communication system resource allocation;
   b) setting an allocation parameter to an initial value;
   c) randomly selecting from a cell of the communication system a changeable communication resource;
   d) identifying a candidate communication resource within the communication system by either randomly selecting the candidate communication resource from another cell of the communication system with a first probability or randomly selecting the candidate communication resource from a plurality of available communication resources with a second probability;
   e) switching the candidate communication resource for the allocated communication resource;
   f) evaluating system performance with the candidate communication resource;
   g) accepting the candidate communication resource if the system performance is improved
   h) accepting the candidate communication resource if the system performance is degraded with a third probability
   i) rejecting the candidate communication resource if it is not accepted in either the step (g) or the step (h) and replacing the candidate communication resource with the changeable communication resource;
   j) repeating the steps (c) through (i) a first number of times;
   k) adjusting the allocation parameter according to a defined schedule;
   l) repeating steps (c) through (j) a second number of times while the allocation parameter exceeds a threshold value; and
   m) downloading the communication system resource allocation to the communication system database.

14. The method of claim 13 wherein the third probability is a function of the allocation parameter.

15. The method of claim 14 wherein the step (k) further comprises, measuring an acceptance rate of candidate communication resources and adjusting the allocation parameter if the acceptance rate is less an acceptance threshold.

16. The method of claim 15 further comprising after the step (k) marking as non-changeable communication resources if failed consecutive attempts to substitute candidate communication resources therefore goes above a freeze threshold.

17. The method of claim 13 wherein the step (f) comprises calculating a system interference value.

18. The method of claim 17 wherein the step of calculating a system interference value comprises determining an interference level between the candidate communication resource and an interfering communication resource as the inverse of the carrier-to-interferer ratio expressed as a power ratio.

19. The method of claim 18 wherein the step of calculating a system interference value further comprises:
   ii) identifying a type of the interfering communication resource; and
   iii) modifying the system interference value in response to the type.

20. The method of claim 18 wherein the step of calculating a system interference value further comprises the steps of:
   vi) repeating the steps (i) through (iii) for a plurality of interfering communication resources; and
   v) summing the system interference value for each of the plurality of interfering communication resources.

21. The method of claim 20 wherein the step of identifying a type of the interfering communication resource comprises determining if the interfering communication resource belongs to a neighbor cell, a same site cell or a same cell.

22. The method of claim 20 wherein the step of identifying a channel type of the interfering communication resource comprises determining if the interfering channel is a co-channel communication resource or an adjacent-channel communication resource.

23. A method of allocating communication channels in a cellular communication system comprising the steps of:
   a) retrieving from a communication system database a communication channel allocation;
   b) setting an allocation parameter to an initial value;
   c) randomly selecting from a cell of the communication system a changeable communication channel;
   d) identifying a candidate communication channel within the communication system by either randomly selecting the candidate communication channel from another cell of the communication system with a first probability or randomly selecting the candidate communication channel from a plurality of available communication channels with a second probability;
   e) switching the candidate communication channel for the allocated communication channel;
   f) calculating a system interference value by:
      i) determining an interference level between the candidate communication resource and an interfering communication resource as the inverse of the carrier-to-interferer ratio expressed as a power ratio;
      ii) identifying a type of the interfering channel;
      iii) modifying the interference level in response to the type;
      iv) repeating the steps (i) through (iii) for a plurality of interfering channels; and
      v) summing the interference level for each of the plurality of interfering channels;

g) accepting the candidate communication channel if the system performance is improved;

h) accepting the candidate communication channel if the system performance is degraded with a third probability;

i) rejecting the candidate communication channel if it is not accepted in either the step (g) or the step (h) and replacing the candidate communication channel with the changeable communication channel;

j) repeating the steps (c) through (i) a first number of times;

k) adjusting the allocation parameter according to a defined schedule;

l) repeating steps (c) through (j) a second number of times while the allocation parameter exceeds a threshold value; and m) downloading the communication channel allocation to the communication system database.

24. The method of claim 23 wherein the third probability is a function of the allocation parameter.

25. The method of claim 24 wherein the step (k) further comprises, measuring an acceptance rate of candidate communication channels and adjusting the allocation parameter if the acceptance rate is less an acceptance threshold.

26. The method of claim 25 further comprising after the step (k) marking as non-changeable communication channels if failed consecutive attempts to substitute a candidate communication resource therefore goes above a freeze threshold.

27. The method of claim 23 wherein the step of identifying a type of the interfering channel comprises determining if the channel belongs to a neighbor cell, a same site cell or a same cell.

28. The method of claim 27 wherein the step of identifying a channel type of the interfering channel further comprises determining if the interfering channel is a co-channel or an adjacent-channel.

* * * * *